United States Patent
Ramirez Ortiz et al.

(10) Patent No.: US 10,400,881 B1
(45) Date of Patent: Sep. 3, 2019

(54) GEAR CASE WITH MOUNTING ARM

(71) Applicants: Robert Bosch Mexico Sistemas Automotrices S.A. de C.V., Toluca (MX); Robert Bosch GmbH, Stuttgart (DE)

(72) Inventors: Luis Angel Ramirez Ortiz, Toluca (MX); Andrea Elena Tejeda Geurrero, Toluca (MX)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/108,491

(22) Filed: Aug. 22, 2018

(51) Int. Cl.
*F16H 57/021* (2012.01)
*B60N 2/22* (2006.01)
*F16H 57/02* (2012.01)

(52) U.S. Cl.
CPC ......... *F16H 57/021* (2013.01); *B60N 2/2213* (2013.01); *F16H 2057/02026* (2013.01); *F16H 2057/02034* (2013.01); *F16H 2057/02039* (2013.01)

(58) Field of Classification Search
CPC ......... F16H 57/021; F16H 2057/02026; F16H 2057/02034; F16H 2057/02039; B60N 2/2213
See application file for complete search history.

(56) References Cited

U.S. PATENT DOCUMENTS

| | | | |
|---|---|---|---|
| 9,421,891 B2 | 8/2016 | Andres et al. | |
| 9,969,303 B2 | 5/2018 | Ta et al. | |
| 2016/0169326 A1* | 6/2016 | Fujii | F16H 1/08 74/414 |
| 2016/0355104 A1 | 12/2016 | Kim et al. | |
| 2017/0314643 A1* | 11/2017 | Hudson | F16H 1/203 |

FOREIGN PATENT DOCUMENTS

KR 20110080092 A 7/2011

OTHER PUBLICATIONS

Bosch Automotive Aftermarket. Electric Motors. 2013-2014. pp. 1 and 4-24.

* cited by examiner

*Primary Examiner* — Vicky A Johnson
(74) *Attorney, Agent, or Firm* — Kathy K. Takeguchi; Maginot Moore & Beck LLP

(57) ABSTRACT

A gear housing includes a first receptacle, a second receptacle, an elongated receptacle, a connecting portion, and a mounting arm. The first receptacle is configured to house a worm wheel. The second receptacle is configured to house an output gear. The elongated receptacle is configured to house a first portion of a shaft of a drive assembly. The elongated receptacle extends at least partly alongside the first receptacle and the second receptacle. The connecting portion is connectable to another housing that houses a second portion of the shaft of the drive assembly. The mounting arm extends outward from the first receptacle. The mounting arm is disposed between circumferentially adjacent fastening components along a periphery of the first receptacle. The first fastening component is disposed at a juncture between the first receptacle and the second receptacle. The second fastening component overlaps a part of the elongated receptacle.

20 Claims, 10 Drawing Sheets

GEAR CASE WITH MOUNTING ARM

FIELD OF THE INVENTION

This disclosure relates generally to gear cases, and more particularly to gear cases for at least gear assemblies of electric motor devices.

BACKGROUND

In general, electric motor devices, such as actuators, are typically mounted to seat frames to provide seats with various reclining angles and positions. However, often times, it may be relatively cumbersome and time-consuming to align and mount these types of seat adjusting actuators into proper position on the seat frames. In addition, the functionality and performance of the drive of these seat adjusting actuators may be negatively affected by the manner and the configuration of components involved in mounting the seat adjusting actuators to the seat frames due to various forces associated therewith. Moreover, the components and construction of the gear cases themselves may negatively affect the functionality and performance of the seat adjusting actuators. For example, the number and position of the fastening mechanisms may negatively impact the drive of these seat adjusting actuators.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a gear housing includes a first receptacle, a second receptacle, an elongated receptacle, a connecting portion, and a mounting arm. The first receptacle is configured to house a worm wheel of the gear assembly. The second receptacle is configured to house an output gear of the gear assembly. The elongated receptacle is configured to house a first portion of a shaft of a drive assembly. The elongated receptacle extends at least partly alongside the first receptacle and the second receptacle. The connecting portion is connectable to another housing that houses a second portion of the shaft of the drive assembly. The mounting arm is mountable to a mounting surface. The mounting arm extends outward from the first receptacle. The mounting arm is disposed between circumferentially adjacent fastening components along a periphery of the first receptacle. The adjacent fastening components include a first fastening component and a second fastening component. The first fastening component is disposed at a juncture between the first receptacle and the second receptacle. The second fastening component overlaps a part of the elongated receptacle.

In an example embodiment, the gear case includes a gear housing. The gear housing includes a gear assembly portion, an elongated receptacle, a mounting arm, and a gear cover. The gear assembly portion is configured to house a gear assembly. The gear assembly portion includes a first receptacle and a second receptacle. The elongated receptacle is configured to house a first portion of a shaft of a drive assembly. The elongated receptacle extends at least partly alongside the gear assembly portion. The mounting arm is mountable on a mounting surface. The mounting arm extends outward from the first receptacle. The mounting arm is disposed between circumferentially adjacent fastening components along a periphery of the first receptacle. The adjacent fastening components include a first fastening component and a second fastening component. The gear cover is configured to cover the gear assembly portion. The gear cover is securable to the gear housing via at least the first fastening component and the second fastening component. The first fastening component is disposed at a juncture between the first receptacle and the second receptacle. The second fastening component overlaps a part of the elongated receptacle.

In an example embodiment, a gear case includes a gear housing. The gear housing is configured to house a gear assembly. The gear housing includes a first receptacle, a second receptacle, an elongated receptacle, a connecting portion, and a mounting arm. The first receptacle is configured to house a worm wheel of the gear assembly. The second receptacle is configured to house an output gear of the gear assembly. The elongated receptacle is configured to house a first portion of a shaft of a drive assembly. The elongated receptacle extends at least partly alongside the first receptacle and the second receptacle. The connecting portion is connectable to another housing, which houses a second portion of the shaft of the drive assembly. The mounting arm includes a first section and a second section. The first section extends from the first receptacle. The second section is disposed at an end of the first section such that the first section is between the first receptacle and the second section. The first section and the connecting portion are supported by bracing members that extend between a sidewall of the mounting arm and a sidewall of the connecting portion. The second section extends beyond the connecting portion and the bracing members along a longitudinal axis of the gear housing. The second section includes a surface that includes a through-hole and a coupling device. The coupling device includes a hook portion, which protrudes outward from the surface.

These and other features, aspects, and advantages of the present invention are further clarified by the following detailed description of certain exemplary embodiments in view of the accompanying drawings throughout which like characters represent like parts.

DETAILED DESCRIPTION

The embodiments described above, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
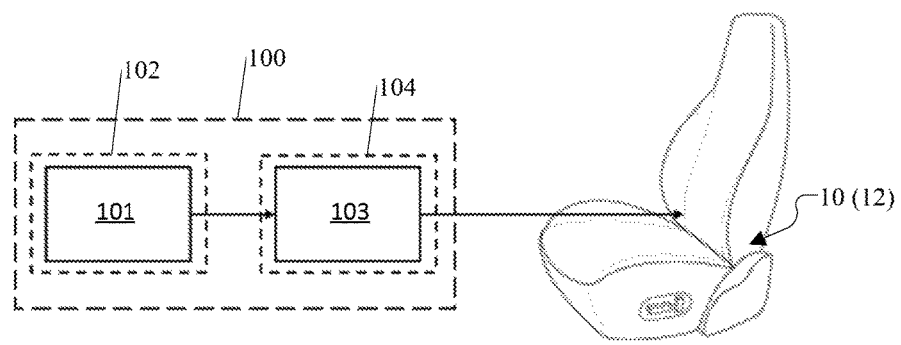
FIG. 1 is a non-limiting example of a system that includes an actuator according to an example embodiment of this disclosure.
Figure 2:
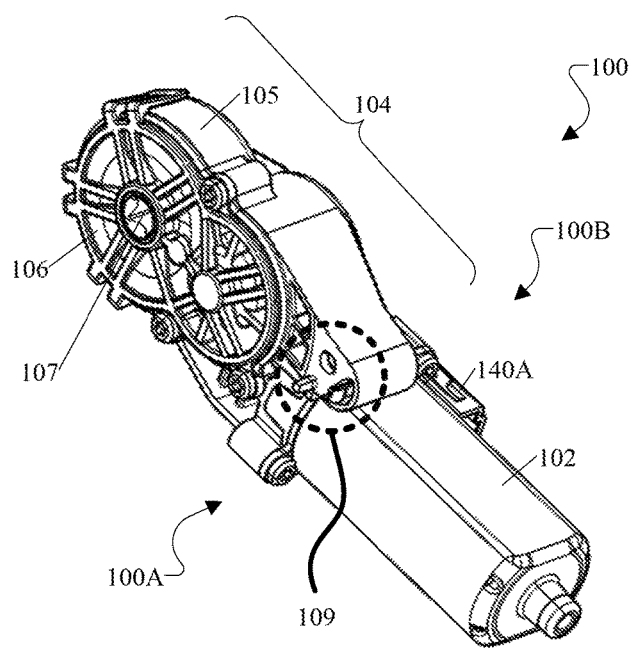
FIG. 2 is a perspective view of an actuator according to an example embodiment of this disclosure.

FIG. 1 illustrates an electric motor device according to an example embodiment. In an example embodiment, the electric motor device is an actuator 100. The actuator 100 is usable and advantageous in a number of different scenarios and applications. For example, the actuator 100 is applicable to seat adjustments, power windows, various apparatuses, and other suitable applications. In FIG. 1, for instance, the actuator 100 is mounted to at least one mounting surface 12 (e.g., seat frame) to provide seat adjustments so that the seat 10 can move into and maintain various positions and/or reclining angles. In this regard, when implemented for seat adjustments, the actuator 100 is operable to provide a mechanical force to at least the seat frame 12. In this example, the actuator 100, the seat frame 12, and the seat 10 are provided within a vehicle (not shown).

In an example embodiment, the actuator 100 includes at least a drive assembly 101, a drive housing 102, a gear assembly 103, and a gear case 104. The drive assembly 101 includes a motor, which drives the gear assembly 103 to provide a drive output. In FIG. 1, the drive assembly 101 includes components, which are housed at least in the drive housing 102, while the gear assembly includes components, which are housed in the gear case 104. Also, in an example embodiment, the gear case 104 is structured to house at least some components of the drive assembly 101 so that the drive assembly 101 is enabled to engage with the gear assembly 103 to provide a drive output.

FIGS. 2-6 illustrate different views of the actuator 100 according to an example embodiment. As shown in FIGS. 2-6, the actuator 100 includes a first side 100A and a second side 100B, which face in opposite directions. The first side 100A of the actuator 100 is structured to interact with at least one mounting surface 12. In this regard, for example, on the first side 100A of the actuator 100, the gear case 104 includes a gear cover 106 with an opening 107 that provides access to the output gear shaft 116 (FIG. 7) when disposed within the gear case 104. Also, on the first side 100A, the actuator 100 includes a mounting assembly 109, which is structured to contact and engage with at least one mounting surface 12. In this regard, the actuator 100 is securable to at least one mounting surface 12. Furthermore, as an advantage, in FIG. 2, the actuator 100 includes at least one part (e.g. protruding part 140A of brush holder 140), which is located at a non-interfering position with respect to the mounting assembly 109, thereby enabling the first side 100A of the actuator 100 to interact with at least one mounting surface 12 in a stable and secure manner.

Figure 4:
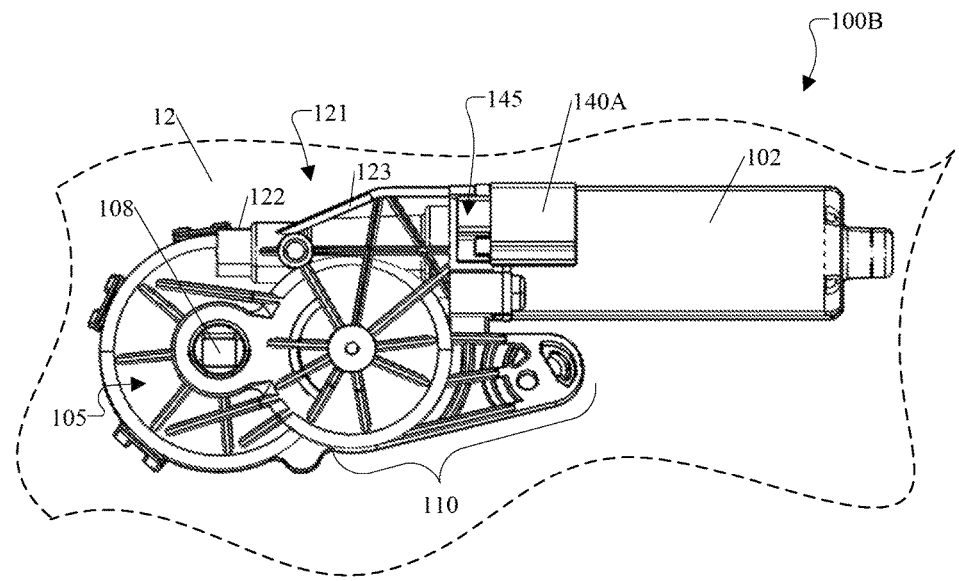
FIG. 4 is a view of a second side of the actuator of FIG. 2 according to an example embodiment of this disclosure.
Figure 6:
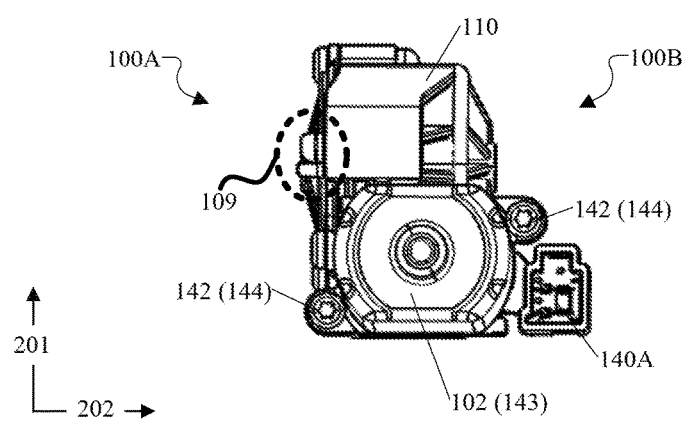
FIG. 6 is view of an end portion of the actuator of FIG. 2 according to an example embodiment of this disclosure.

In an example embodiment, on the second side 100B, the gear case 104 includes a gear housing 105 with an opening 108 via which at least the output gear shaft 116 is accessible when the output gear shaft 116 is disposed within the gear case 104. The opening 108 on the second side 100B of the gear case 104 is aligned with the opening 107 on the first side 100A of the gear case 104. Also, in an example embodiment, the second side 100B of the actuator 100 faces away from the mounting surface 12. In this regard, for instance, as shown in FIG. 4, the second side 100B of the actuator 100 can provide space to accommodate a protruding part 140A of the brush holder 140. More specifically, as shown in FIG. 6, the protruding part 140A of the brush holder 140 extends on a different peripheral portion of the actuator 100 than that of the mounting assembly 109, which is provided at least on a mounting arm 110 of the gear case 104. With this configuration, the actuator 100 is able to be mounted to at least one mounting surface 12 in a secure manner via the mounting assembly 109 of the mounting arm 110.

Figure 3:
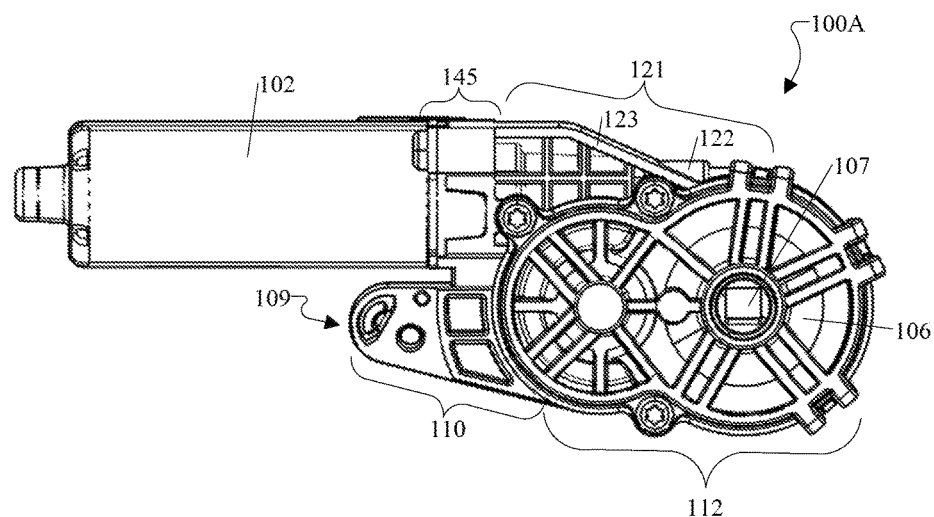
FIG. 3 is a view of a first side of the actuator of FIG. 2 according to an example embodiment of this disclosure.
Figure 7:
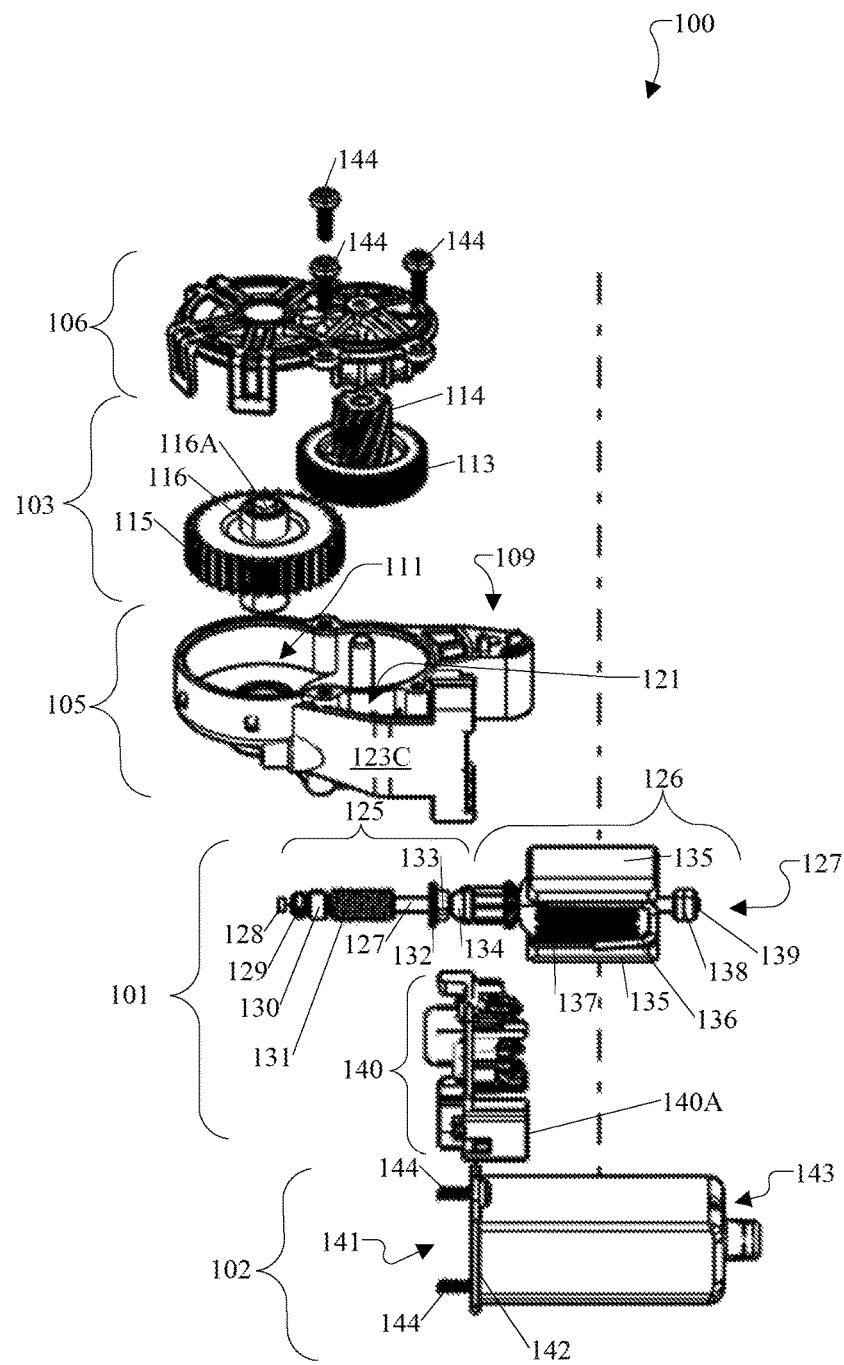
FIG. 7 is an exploded view of some of the components of the actuator according to an example embodiment of this disclosure.

FIG. 7 is an exploded view of components of the gear assembly 103 and the drive assembly 101 in relation to at least the gear case 104 and the drive housing 102. More specifically, in FIG. 7, for instance, the gear case 104 includes at least the gear housing 105 and the gear cover 106. In an example embodiment, the gear housing 105 is structured to house at least components of the gear assembly 103. For example, as shown in FIGS. 3 and 7, the gear housing 105 includes a gear assembly portion 112, which is structured to house the gear assembly 103 that includes at least a worm wheel 113, a worm wheel shaft 114, an output gear 115, and an output gear shaft 116. In addition, the gear housing 105 includes an opening 111 in the gear assembly portion 112. The gear assembly portion 112 is structured to receive the gear assembly 103 via the opening 111 on the first side 100A of the gear housing 105. Also, as shown in FIG. 7, the gear case 104 includes the gear cover 106, which is structured to protect the gear assembly 103 by covering the opening 111 in the gear assembly portion 112 of the gear housing 105.

In an example embodiment, the gear housing 105 is structured to house at least a part of the drive assembly 101. For example, as shown in at least FIGS. 3-4 and 7, the gear housing 105 includes a drive assembly portion 121, which extends at least partly alongside the gear assembly portion 112. The drive assembly portion 121 is connected to and joined with the gear assembly portion 112 such that at least one part of the first section 125 of the drive assembly 101 is configured to interact with at least one part of the gear assembly 103. In this regard, for instance, as shown in FIG. 7, the worm 131 of the drive assembly 101 is configured to engage with the worm wheel 113 of the gear assembly 103. Moreover, the worm wheel 113 is configured to engage with the worm wheel shaft 114, which is configured to drive the output gear 115 and thus the output gear shaft 116 to provide a drive output. More specifically, in an example embodiment, the drive assembly portion 121 is structured to house the first section 125 of the drive assembly 101, which includes at least a first end portion of the drive shaft 127 along with a damping element 128, a thrust bearing disc 129, a bushing 130, a worm 131, a washer 132, a bearing 133, any suitable mechanical element, or any combination thereof.

In an example embodiment, the drive assembly portion 121 includes an elongated receptacle 122 and a support structure 123. In an example embodiment, as shown in FIGS. 3-4 and 10-11, the elongated receptacle 122 extends along a longitudinal axis 200 of the actuator 100. The elongated receptacle 122 is configured to house the first section 125 of the drive assembly 101. In an example embodiment, the support structure 123 includes at least a first side 123A (FIG. 10), a second side 123B (FIG. 11), and a third side 123C (FIG. 7), which provide support to the elongated receptacle 122. More specifically, in an example embodiment, the first side 123A includes a first network of support members 124A that support the drive assembly portion 121 in relation to adjacent parts of the gear housing 105. Also, in an example embodiment, the second side 123B includes a second network of support members 124B that support the drive assembly portion 121 in relation to adjacent parts of the gear housing 105.

Figure 14:
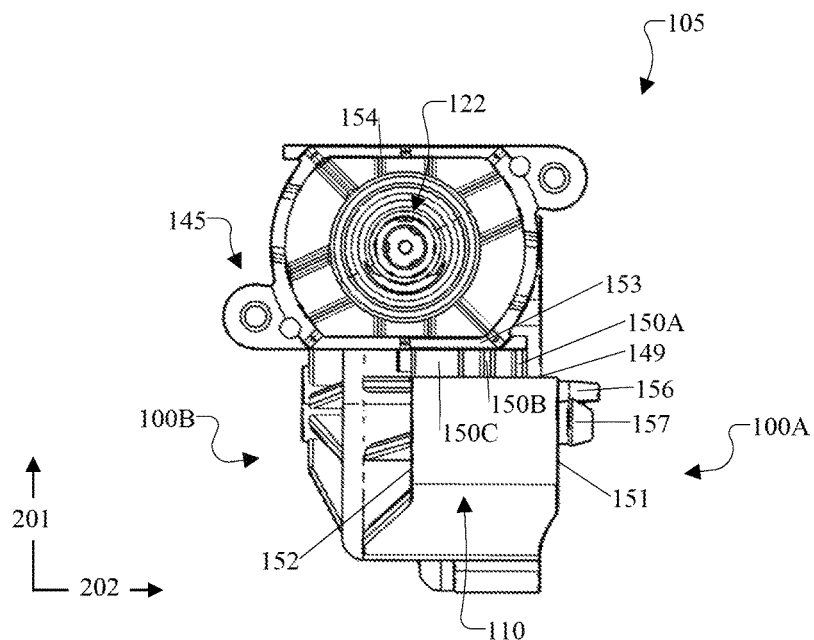
FIG. 14 is a view of an end portion of the gear housing according to an example embodiment of this disclosure.

In an example embodiment, the drive assembly portion 121 is connected to and/or integral with a connecting portion 145. As shown in FIGS. 3-4, the connecting portion 145 is connectable to the drive housing 102. In an example embodiment, as shown in FIG. 14, the connecting portion 145 includes tabs with through-holes in which mechanical fasteners 144 are receivable within the through-holes to secure the gear housing 105 to the drive housing 102. In an example embodiment, the connecting portion 145 of the gear housing 105 is aligned with a corresponding connecting portion 142 (FIG. 7) of the drive housing 102 such that the tabs and through-holes of the connecting portion 145 are aligned with corresponding tabs and through-holes of the connecting portion 142 for the receipt of mechanical fasteners 144, as shown in FIG. 6.

In an example embodiment, the drive housing 102 is an elongated member. As shown in FIG. 7, the drive housing 102 includes an open end portion 141 and a closed end portion 143. In an example embodiment, at the open end portion 141, the drive housing 102 includes the connecting portion 142, which is structured to connect with a corresponding connecting portion 145 of the gear housing 105 via mechanical fasteners 144 (e.g. screws or any suitable device). In this regard, the open end portion 141 provides a passageway that enables the drive assembly 101 to be housed in both the gear housing 105 and the drive housing 102. For example, in FIG. 7, the drive housing 102 is structured to house at least a at least a part of the second section 126 of the drive assembly 101, which includes at least a second end portion of the drive shaft 127 along with a magnet/thrust ring 134, magnets 135, springs 136, arma-ture 137, sintered metal bushing 138, a washer 139, any suitable device, or any combination thereof.

Figure 8:
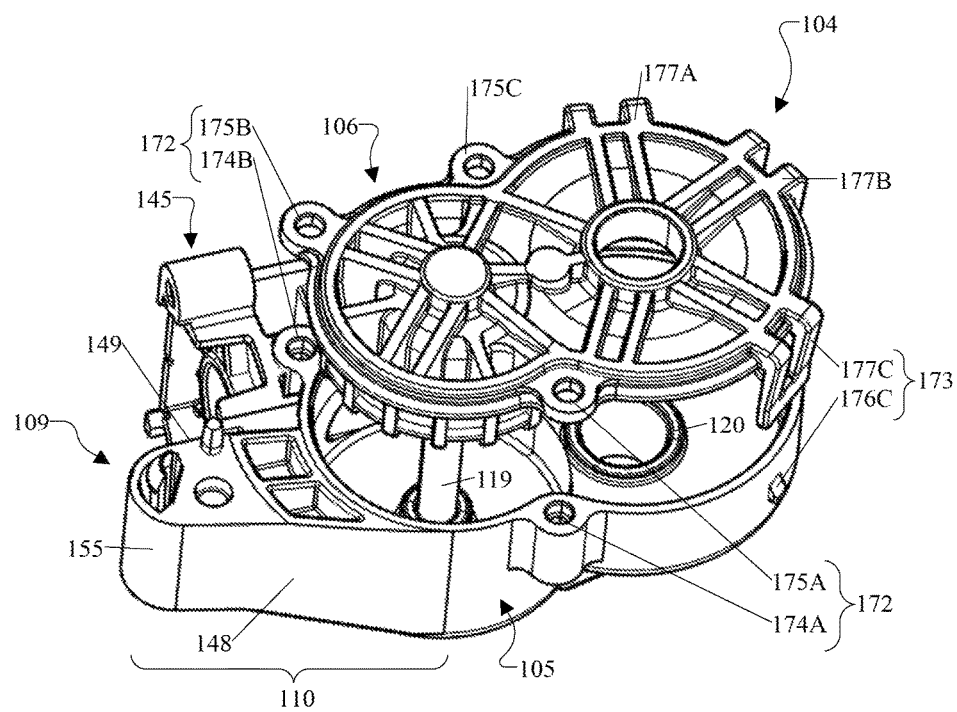
FIG. 8 is a view of the first side of the gear case with the gear cover separated and spaced from the gear housing according to an example embodiment of this disclosure.
Figure 9:
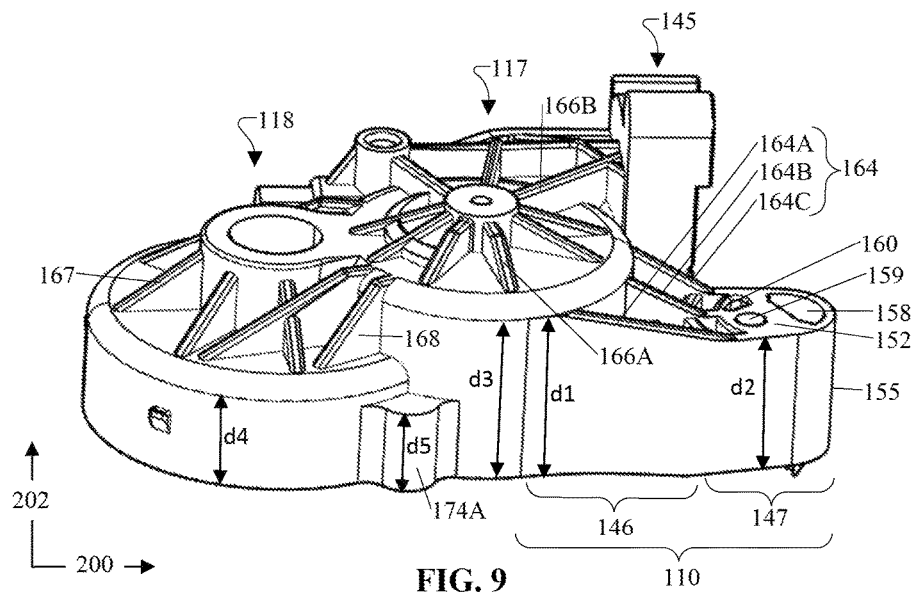
FIG. 9 is a view of the second side of the gear case according to an example embodiment of this disclosure.
Figure 15:
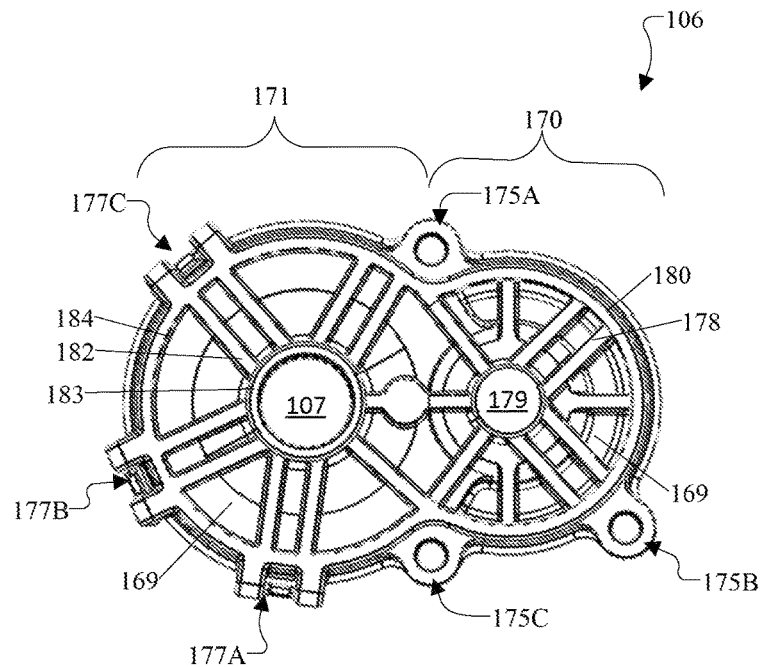
FIG. 15 is a view of a first side of a gear cover according to an example embodiment of this disclosure.
Figure 16:
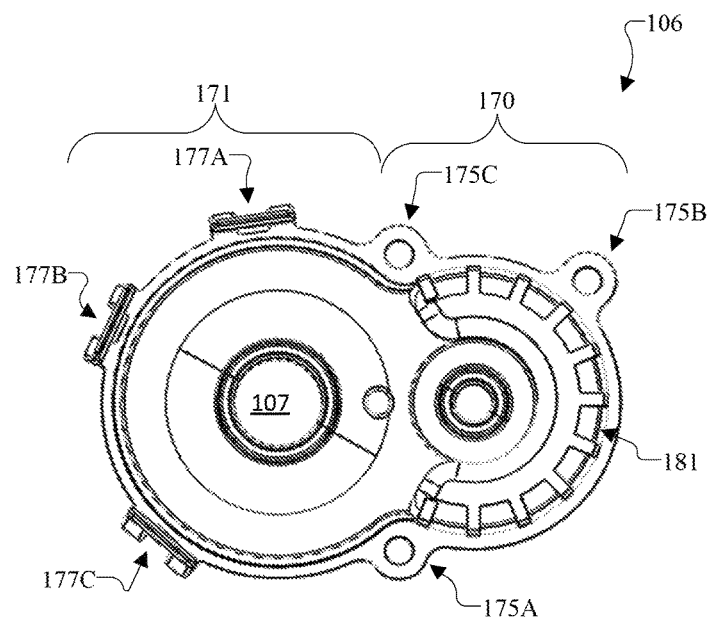
FIG. 16 is a view of a second side of the gear cover of FIG. 15 according to an example embodiment of this disclosure.
Figure 17:
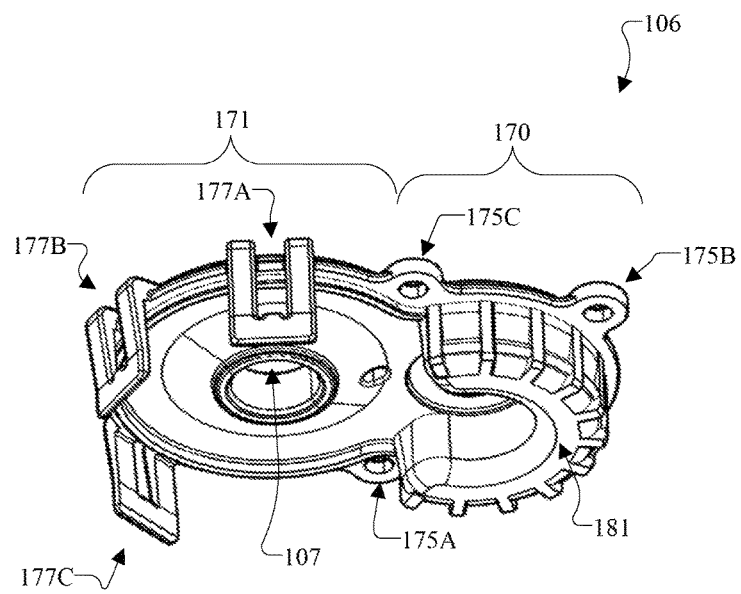
FIG. 17 is a perspective view of the gear cover of FIG. 15 according to an example embodiment of this disclosure.

FIGS. 8-17 illustrate different views of the gear case 104 according to an example embodiment. More specifically, FIG. 8 illustrates the first side 100A of the gear case 104 while FIG. 9 illustrates the second side 100B of the gear case 104. In addition, FIGS. 10-14 illustrate different views of the gear housing 105 while FIGS. 15-17 illustrate different views of the gear cover 106. As shown in at least FIGS. 8-17, the gear case 104 includes a number of advantageous features, as discussed below.

Figure 10:
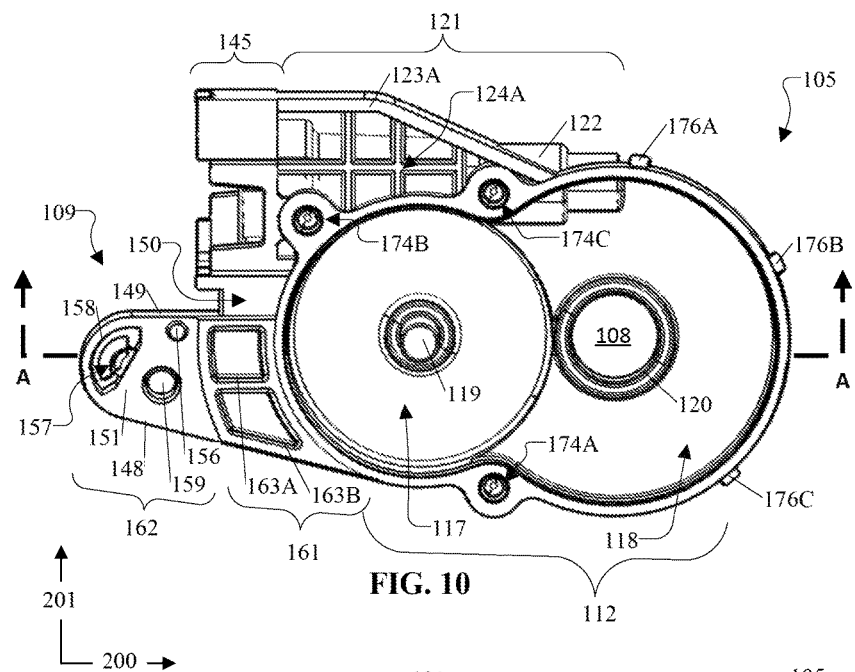
FIG. 10 is a view of the first side of the gear housing according to an example embodiment of this disclosure.
Figure 11:
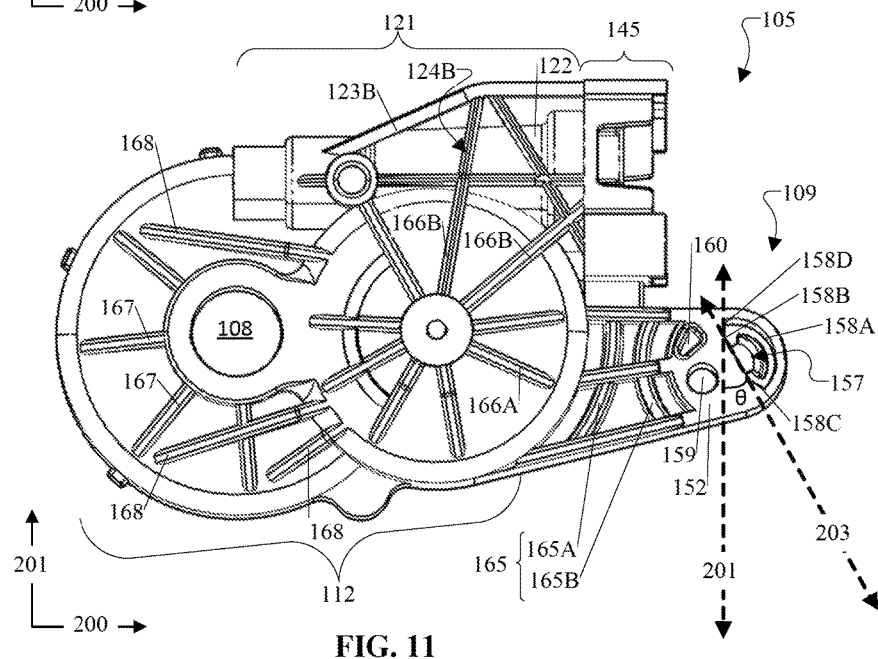
FIG. 11 is a view of the second side of the gear housing according to an example embodiment of this disclosure.

In an example embodiment, the gear case 104 includes the gear assembly portion 112 to house the gear assembly 103. In this regard, the gear assembly portion 112 is a sturdy and rigid structure. For example, as shown in FIG. 10, the gear assembly portion 112 includes at least a first receptacle 117 and a second receptacle 118. More specifically, on the first side 100A, as shown in FIG. 10, the gear assembly portion 112 includes an opening 111 (FIG. 7) to receive the gear assembly 103. Meanwhile, on the second side 100B, as shown in FIGS. 9 and 11, the gear assembly portion 112 includes reinforcing members 166. For example, the first receptacle 117 includes a plurality of reinforcing members 166A, which extend from a center region of the first receptacle 117 to a peripheral region of the first receptacle 117. In addition, the first receptacle 117 includes one or more reinforcing members 166B, which extend from the center region of the first receptacle 117 towards regions outside of the first receptacle 117. For instance, in FIG. 11, the reinforcing members 166B extend from the center region of the first receptacle 117 to the drive assembly portion 121, thereby providing reinforcement between the first receptacle 117 and the drive assembly portion 121. Also, the second receptacle 118 includes reinforcing members 167 that extend from a center region of the second receptacle 118 to a peripheral region of the second receptacle 118. In addition, the gear assembly portion 112 includes reinforcing members 168 that extend from the peripheral region of the first receptacle 117 towards the peripheral region of the second receptacle 118, thereby providing reinforcement between the first receptacle 117 and the second receptacle 118.

In an example embodiment, the first receptacle 117 is structured to house at least the worm wheel 113 and the worm wheel shaft 114. The first receptacle 117 includes structural bounds that are cylindrical or generally cylindrical. The first receptacle 117 is structured to provide sufficient clearance such that the worm wheel 113 is enabled to move therein. In addition, the first receptacle 117 includes a rod 119 about which the worm wheel 113 and worm wheel shaft 114 move. Also, as shown in FIGS. 7 and 10, the first receptacle 117 is joined with the second receptacle 118 such that the worm wheel 113 is configured to drive the worm wheel shaft 114, which is configured to drive the output gear 115.

In an example embodiment, the second receptacle 118 is structured to house at least the output gear 115 and the output gear shaft 116. The second receptacle 118 includes structural bounds that are cylindrical or generally cylindrical. The second receptacle 118 is structured to provide sufficient clearance such that the output gear 115 is enabled to move therein. In addition, the second receptacle 118 includes the opening 108 via which the output gear 115 and output gear shaft 116 are accessible. The second receptacle 118 includes a protruding frame 120, which surrounds the opening 108 and which ensures proper positioning and alignment of the output gear 115 and output gear shaft 116. The opening 108, which is defined within the gear housing 105, is aligned with the opening 107, which is defined within the gear cover 106. In this regard, each of the openings 107 and 108 is defined within the gear case 104 to provide access to the output gear 115 and the output gear shaft 116 for a drive output.

In an example embodiment, the gear case 104 includes the mounting arm 110 with the mounting assembly 109 to mount the actuator 100 to at least one mounting surface 12. In an example embodiment, the mounting arm 110 is an elongated member, which extends generally along the longitudinal axis 200 of the actuator 100. In an example embodiment, as shown in FIG. 10, the mounting arm 110 includes a first sidewall portion 148 that is tangent to the first receptacle 117. In addition, the mounting arm 110 includes a second sidewall portion 149 that is opposite to the first sidewall portion 148. In an example embodiment, the mounting arm 110 extends outward from an outer circumferential surface portion of the first receptacle 117 of the gear housing 105. The mounting arm 110 includes at least a first end portion 146 and a second end portion 147. For example, as shown in FIG. 9, the first end portion 146 is connected to or integral with the first receptacle 117 while the second end portion 147 is a free end. Also, in an example embodiment, the mounting arm 110 is curved at the second end portion 147 to provide more deformation resistant characteristics compared to a configuration having sharp corner portions. For example, the mounting arm 110 includes at least one curved outer wall surface portion 155 at the second end portion 147 to reduce stress concentrations compared to a configuration having sharp corner portions.

Figure 5:
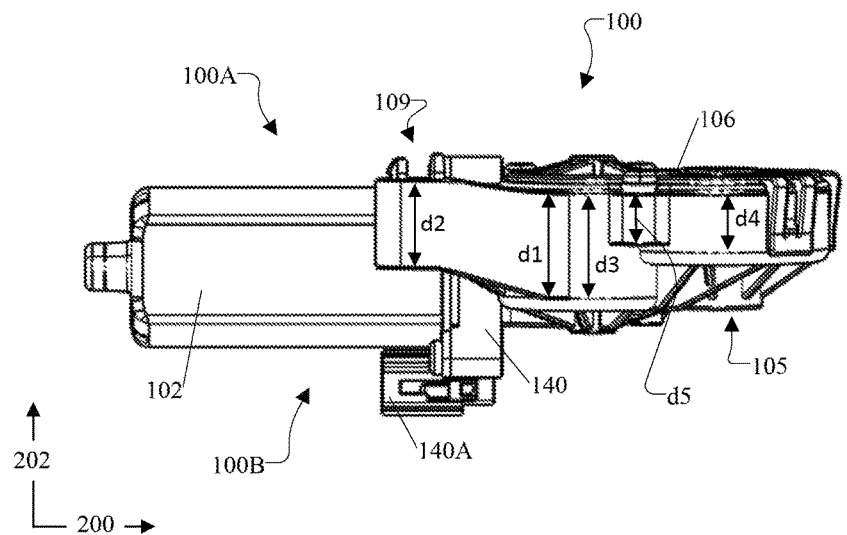
FIG. 5 is a side view of the actuator of FIG. 2 according to an example embodiment of this disclosure.

In an example embodiment, as shown in FIGS. 5 and 9, the first end portion 146 has a dimension ("d1") and the second end portion 147 has a dimension ("d2"). In an example embodiment, the dimension d is larger than the dimension d2 such that the mounting arm 110 is tapered from the first end portion 146 to the second end portion 147. In this regard, the dimensions of the mounting arm 110 enable the mounting arm 110 to be secured to the mounting surface 12 in an effective manner while supporting the actuator 100 itself. Also, in an example embodiment, the dimension d1 is the same or substantially the same as a dimension ("d3"), which is taken at the first receptacle 117 from which the first end portion 146 of the mounting arm 110 extends. Meanwhile, in an example embodiment, the second receptacle 118 has a dimension ("d4"), which is less than the third dimension d3. Similarly, the dimension d4 is less than the dimension d1. In an example embodiment, the dimension d4 is less than the second dimension d2 of the second end portion 147 of the mounting arm 110.

In an example embodiment, as shown in FIGS. 10 and 14, the mounting arm 110 is connected to or integral with at least one or more parts of the gear housing 105 via one or more bracing members 150. In this regard, each bracing member 150 supports the mounting arm 110 relative to one or more parts of the gear housing 105. For example, as shown at least in FIGS. 10 and 14, each bracing member 150 extends between the mounting arm 110 and at least the connecting portion 145. In addition, each bracing member 150 is adjacent to and/or extends from a peripheral portion of the first receptacle 117. Each bracing member 150 comprises any suitable structural configuration so long as each bracing member 150 provides an appropriate amount of strength and support to at least the mounting arm 110 in relation to the connecting portion 145, and/or one or more parts of the gear housing 105 (e.g., the drive assembly portion 121).

In an example embodiment, there are a plurality of bracing members 150 between the mounting arm 110 and the connecting portion 145. For example, in FIG. 14, the plurality of bracing members 150 includes at least a first bracing member 150A, a second bracing member 150B, and a third bracing member 150C. In this example, each of the bracing members 150A, 150B, and 150C is plate or plate-like. More specifically, in FIG. 14, the first bracing member 150A is spaced from the first surface 151 of the mounting arm 110 along the second axis 202 so as to be disposed between a first sidewall portion 153 of the connecting portion 145 and the second sidewall portion 149 of the mounting arm 110. The first sidewall portion 153 is adjacent to the mounting arm 110 and is opposite to a second sidewall portion 154. The second bracing member 150B is disposed between the first bracing member 150A and the third bracing member 150C. In an example embodiment, the second bracing member 150B has a thickness, which is the same or substantially similar to the first bracing member 150A. The third bracing member 150C is flush or substantially flush with the second surface 152 of the mounting arm 110, and spaced from an end of the first sidewall portion 153 of the connecting portion 145 along the second axis 202 so as to be disposed between the first sidewall portion 153 of the connecting portion 145 and the second sidewall portion 149 of the mounting arm 110. In an example embodiment, the third bracing member 150C is disposed closer to the drive shaft 127 and is thus thicker than the first bracing member 150A, the second bracing member 150B, or both the first and second bracing members 150A and 150B.

In an example embodiment, on the first side 100A, as shown in FIG. 10, the mounting arm 110 includes at least a rib section 161 at the first end portion 146 and a mounting section 162 at the second end portion 147. In an example embodiment, the rib section 161 is disposed between the first receptacle 117 and mounting section 162. The rib section 161 includes a plurality of ribs to provide structural strength and rigidity to the mounting arm 110. For example, as shown in FIG. 10, on the first side 100A, the rib section 161 includes at least a first rib frame 163A and a second rib frame 163B, which provide structural support to the mounting arm 110.

In an example embodiment, on the second side 100B, the mounting arm 110 is provided with a first set of ribs 164 and a second set of ribs 165. For example, as shown in FIG. 9, the first set of ribs 164 slope downwards from the first receptacle 117 towards the second end portion 147. In an example embodiment, as shown in FIG. 11, the second set of ribs 165 include at least one rib 165A that includes a curved portion that corresponds to a curvature of the first receptacle 117. In addition, the second set of ribs 165 include at least one rib 165B that includes a curved portion that faces in a direction that is opposite to the rib 165A. In this regard, for instance, the first set of ribs 164 and the second set of ribs 165 provide structural support and rigidity to the mounting arm 110.

In an example embodiment, the mounting section 162 includes at least a mounting assembly 109 such that the mounting arm 110 (and hence also the actuator 100) is mountable on at least one mounting surface 12 with ease. In an example embodiment, the mounting assembly 109 includes an alignment feature, a fastening feature, any suitable mechanical feature, or any combination thereof. For example, in FIG. 10, the mounting assembly 109 includes at least a pin 156, a coupling device 157, a slot 158, and a through-hole 159. In this regard, the pin 156 and the coupling device 157 are structured to align and hold the actuator 100 at an appropriate position with respect to at least one mounting surface 12 prior to and during the process of securing the mechanical fastener 144 through the through-hole 159 and the corresponding part of the mounting surface 12. In addition, the mounting assembly 109 enables the actuator 100 to be secured to at least one mounting surface 12 while enabling the actuator 100 to function and operate in a normal and effective manner.

Figure 12:
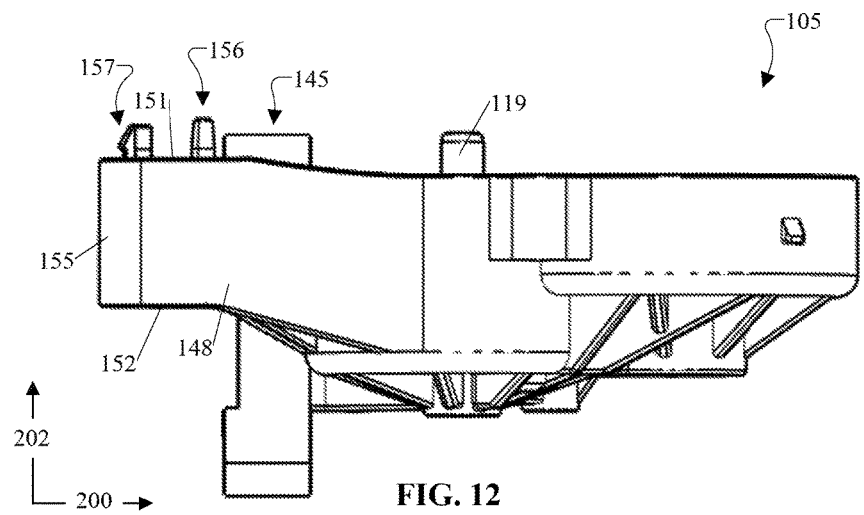
FIG. 12 is a side view of the gear housing according to an example embodiment of this disclosure.
Figure 13:
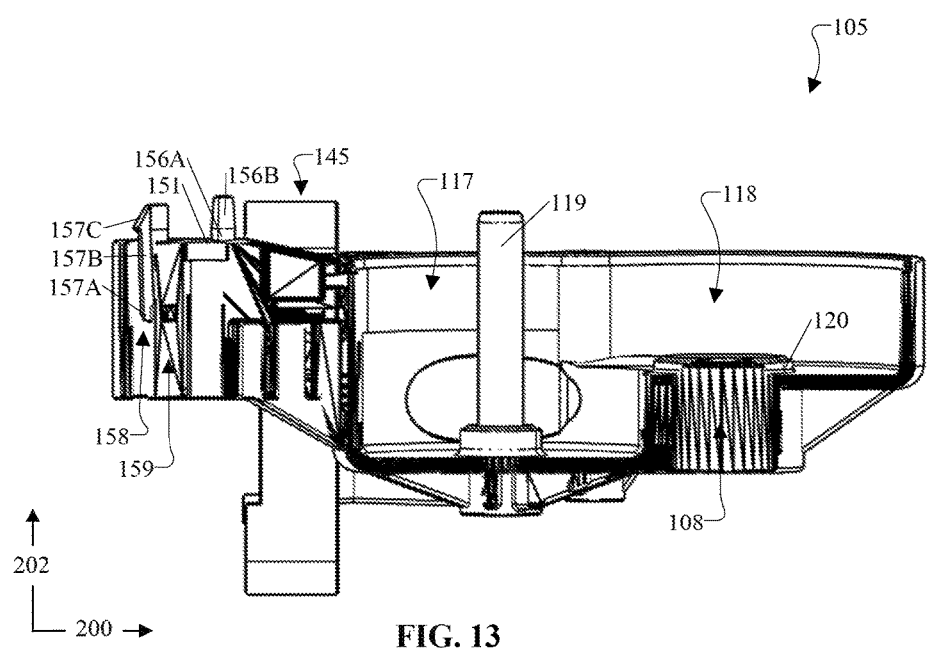
FIG. 13 is a side view of a cross-section of the gear housing that is taken along line A-A of FIG. 10 according to an example embodiment of this disclosure.

In an example embodiment, the pin 156 protrudes outward and along the second axis 202. For example, as shown in FIG. 12, the pin 156 extends beyond the first surface 151 of the mounting arm 110. In this regard, as shown in FIG. 13, the pin 156 includes at least a base portion 156A and a tip portion 156B. The base portion 156A is between the first surface 151 and the tip portion 156B. A periphery of the base portion 156A is greater than a periphery of the tip portion 156B such that the pin 156 is tapered. With this advantageous configuration, the pin 156 is configured to align and mate with a corresponding part, such as a recess, hole, or the like, on the mounting surface 12 with ease. Also, in an example embodiment, on a second side 100B, the mounting arm 110 may include a recessed portion 160 (FIG. 9) that is disposed opposite to the pin 156, as shown in FIG. 11.

In an example embodiment, the coupling device 157 is disposed within the slot 158. For example, as shown in FIGS. 10-13, the slot 158 is greater in size than the coupling device 157 such that there is sufficient clearance between the coupling device 157 and at least some of the sidewalls that define the slot 158. In FIGS. 10-11, the slot 158 extends from the first surface 151 of the mounting arm 110 to the second surface 152 of the mounting arm 110, thereby being a through-hole type of slot 158. In an example embodiment, the slot 158 is defined by at least a sidewall portion 158A, a sidewall portion 158B, a sidewall portion 158C, and a sidewall portion 158D. More specifically, in an example embodiment, the sidewall portion 158A is curved. The curvature of the sidewall portion 158A corresponds to the curvature of the hook portion 157C of the coupling device 157, the curvature of the outer wall surface portion 155 of the mounting arm 110, or both the curvature of the hook portion 157C and the curvature of the outer wall surface portion 155. In an example embodiment, as shown in FIG. 11, the sidewall portion 158B extends linearly along an axis 203. In this regard, the sidewall portion 158B forms an acute angle θ with respect to the first axis 201. The first axis 201 is perpendicular to the longitudinal axis 200. Also, in an example embodiment, the sidewall portion 158C connects one end of the first sidewall portion 158A to one end of the second sidewall portion 158B. The sidewall portion 158D connects an opposite end of the first sidewall portion 158A to an opposite end of the second sidewall portion 158B. In this regard, the slot 158 is advantageous in being able to protect at least portions of the coupling device 157 and ensure a secure engagement between the coupling device 157 and the corresponding part of the mounting surface 12.

In an example embodiment, the coupling device 157 is structured to fasten to a corresponding part on the mounting surface 12. In an example embodiment, as shown in FIGS. 12-13, the coupling device 157 includes at least a base portion 157A, an arm portion 157B, and a hook portion 157C. In FIGS. 10-13, for example, the base portion 157A extends outward from the sidewall portion 158B of the slot 158. As such, the coupling device 157 is disposed at an acute angle θ with respect to the first axis 201. In an example embodiment, the arm portion 157B extends perpendicular to or substantially perpendicular to the base portion 157A. In this regard, the arm portion 157B extends through the slot 158 and along the second axis 202. Also, as shown in FIG. 13, the base portion 157A is disposed at one end of the arm portion 175 while the hook portion 157C is disposed at an opposite end of the arm portion 157B. In an example embodiment, the hook portion 157C protrudes outward from and extends beyond the first surface 151 of the mounting arm 110. In an example embodiment, the hook portion 157C is curved to provide a secure hold on a corresponding part of the mounting surface 12.

In an example embodiment, the mounting section 162 includes at least one through-hole 159. In FIGS. 10-11, for example, the mounting section 162 includes a through-hole 159 that extends from the first surface 151 of the mounting arm 110 to the second surface 152 of the mounting arm 110. In this regard, the through-hole 159 is structured to receive a suitable mechanical fastener 144. For instance, in one example, the mechanical fastener 144 is a screw, a bolt, or any fastening device. By including the through-hole 159 as a part of the mounting assembly 109, the actuator 100 is able to be mounted to the mounting surface 12 in a secure manner.

In an example embodiment, the through-hole 159 is disposed on the outer side of the mounting section 162 whereas the pin 156 is disposed on the inner side of the mounting section 162. In this regard, a distance of the pin 156 to the elongated receptacle 122 is less than a distance of the through-hole 159 to the elongated receptacle 122. This positioning of the through-hole 159 provides a number of advantages. For example, the through-hole 159 is positioned to provide suitable spacing so that the mechanical fastener 144 can be inserted into the through-hole 159 with ease and without interference from other parts (e.g., the drive housing 102, the connecting portion 145, etc.). Moreover, the position of the through-hole 159 provides a secure attachment point for the actuator 100. Also, in an example embodiment, the through-hole 159 is disposed between the rib section 161 and the coupling device 157. In addition, the through-hole 159 is disposed adjacent to the pin 156, which assists in aligning the through-hole 159 with a corresponding mating component, such as a through-hole (not shown) on the mounting surface 12. With this position, the through-hole 159 is configured to receive a mechanical fastener 144 while being supported by at least the pin 156 and the coupling device 157.

In an example embodiment, the mounting arm 110 extends outward from an outer circumferential surface portion of the first receptacle 117 while being spaced from the fastening mechanisms that secure the gear cover 106 to the gear housing 105. In this regard, the gear cover 106 is securable to the gear housing 105 without interfering with the mounting assembly 109 of the mounting arm 110. More specifically, in an example embodiment, the gear cover 106 includes at least one surface 169, which is structured to protect the gear assembly 103 by covering the opening 111 in the gear housing 105. For example, as shown in at least FIGS. 15-17, the gear cover 106 includes at least a first cover portion 170 and a second cover portion 171. The first cover portion 170 is structured to cover the first receptacle 117. The second cover portion 171 is structured to cover the second receptacle 118. In an example embodiment, the first cover portion 170 and the second cover portion 171 are joined to each other to correspond to the joint structure of the first receptacle 117 and the second receptacle 118.

In an example embodiment, the first cover portion 170 includes a plurality of ribs 178, which extend along the surface 169 from a center region 179 to a peripheral region 180 of the first cover portion 170. In an example embodiment, the plurality of ribs 178 are provided on a first side of the first cover portion 170. Meanwhile, on the second side, the first cover portion 170 includes a protruding member 181, which is structured to engage with corresponding interior sidewall portions of the first receptacle 117 so as to align and hold the gear cover 106 to the gear housing 105. In an example embodiment, as shown in FIGS. 16-17, the protruding member 181 contours a periphery of the first cover portion 170 from a first juncture to a second juncture. In this regard, the first juncture is between the first cover portion 170 and the second cover portion 171. The second juncture is disposed opposite to the first juncture. The second juncture is between the first cover portion 170 and the second cover portion 171.

In an example embodiment, the second cover portion 171 includes the opening 107, which is defined within a center region 183 of the second cover portion 171. Also, in an example embodiment, the second cover portion 171 includes a plurality of ribs 182, which extend along the surface 169 from the center region 183 to a peripheral region 184 of the second cover portion 171. In an example embodiment, as shown in FIGS. 15-16, a diameter of the second cover portion 171 is larger than a diameter of the first cover portion 170.

In an example embodiment, the gear cover 106 is structured to attach to and detach from the gear housing 105 via a first set of fasteners 172 and a second set of fasteners 173, as shown in FIG. 8. In an example embodiment, the first set of fasteners 172 include screw fastening components 174 on the gear housing 105 along with corresponding screw fastening components 175 on the gear cover 106. More specifically, in an example embodiment, as shown in FIG. 10, the screw fastening components 174 include at least a first screw fastening component 174A, a second screw fastening component 174B, and a third screw fastening component 174C. In FIG. 10, each of the screw fastening components 174 includes a boss with a receiving portion (e.g., hole) for a mechanical fastener 144. In an example embodiment, as shown in FIG. 9, for instance, the boss has a dimension ("d5"), which is less than the dimension d4 of the second receptacle 118 along the second axis 202. The dimension d5 is less than the dimension d3 of the first receptacle 117. Also, the dimension d5 is less than the dimension d1 of the mounting arm 110. The dimension d5 is less than the dimension d2 of the mounting arm 110.

In an example embodiment, the screw fastening components 174 are disposed about a peripheral portion of at least the first receptacle 117. More specifically, the first fastening component 174A is disposed at a first juncture between the first receptacle 117 and the second receptacle 118. The second fastening component 174B is disposed on the first support structure 123 and/or over the elongated receptacle 122. The third fastening component 174C is disposed at a second juncture between the first receptacle 117 and the second receptacle 118. In addition, the third fastening component 174C is disposed on the first support structure 123 and/or over the elongated receptacle 122.

In an example embodiment, the screw fastening components 174 of the gear housing 105 correspond to and align with the screw fastening components 175 of the gear cover 106. In this regard, for example, as shown in FIG. 15, the screw fastening components 175 include at least a first screw fastening component 175A, a second screw fastening component 175B, and a third screw fastening component 175C. More specifically, each of the screw fastening components 175 includes a tab along with a receiving portion (e.g., hole) for the mechanical fastener 144. In an example embodiment, the tab of each screw fastening component 175 is structured to overlap the boss of each screw fastening component 174 such that the mechanical fasteners 144 are enabled to pass through the tabs of the screw fastening components 175 and are secured to bosses of the screw fastening components 174.

In an example embodiment, each of the screw fastening components 175 is disposed about the periphery of the first cover portion 170. More specifically, as shown in FIG. 15, the first screw fastening component 175A is disposed at a first juncture between the first cover portion 170 and the second cover portion 171. In an example embodiment, the second screw fastening component 175B is disposed closer in distance to the third screw fastening component 175C than the first screw fastening component 175A. In this regard, for example, the second screw fastening component 175B is disposed on a periphery of the first cover portion 170 so as to overlap the support structure 123 and/or the elongated receptacle 122 when the gear cover 106 is disposed on the gear housing 105. The third screw fastening component 175C is disposed at a second juncture between the first cover portion 170 and the second cover portion 171. In addition, the third screw fastening component 175C is disposed on a periphery of the gear cover 106 so as to overlap the support structure 123 and/or the elongated receptacle 122 when the gear cover 106 is disposed on the gear housing 105.

In an example embodiment, the second set of fasteners 173 include snap-fit fastening components 176 on the gear housing 105 and snap-fit fastening components 177 on the gear cover 106. In an example embodiment, as shown in FIG. 10, the snap-fit fastening components 176 include at least a first snap-fit fastening component 176A, a second snap-fit fastening component 176B, and a third snap-fit fastening component 176C. More specifically, in an example embodiment, each of the snap-fit fastening components 176 includes a hook portion, which is structured to provide a snap-fit engagement with a corresponding snap-fit component 177.

In an example embodiment, the snap-fit fastening components 176 are disposed around a peripheral portion of at least the second receptacle 118. More specifically, the first snap-fit fastening component 176A, the second snap-fit fastening component 176B, and the third snap-fit fastening component 176C are spaced from each other along the peripheral portion of the second receptacle 118 between the first screw fastening component 174A and the third first screw fastening component 174C. More specifically, for example, the first snap-fit fastening component 176A is disposed on a peripheral portion of the second receptacle 118 and adjacent to the drive assembly portion 121. The first snap-fit fastening component 176A is disposed between the third screw fastening portion 174C and the second snap-fit fastening component 176B. The second snap-fit fastening component 176B is disposed on a peripheral portion of the second receptacle 118 so as to be between the first snap-fit fastening component 176A and the third snap-fit fastening component 176C. The third snap-fit fastening component 176C is disposed on a peripheral portion of the second receptacle 118 so as to be between the second snap-fit fastening component 176B and the first screw fastening component 174A.

In an example embodiment, the snap-fit fastening components 176 are structured to mate with the second snap-fit fastening components 177 in a snap-fit manner. As such, the snap-fit fastening components 176 correspond to and align with the snap-fit fastening components 177. In this regard, for example, as shown in FIG. 15-17, the snap-fit fastening components 177 include at least a first snap-fit fastening component 177A, a second snap-fit fastening component 177B, and a third snap-fit fastening component 177C. More specifically, in an example embodiment, each of the snap-fit fastening components 177 includes a latch portion, which is structured to provide a snap-fit engagement with a hook portion of a corresponding snap-fit component 176.

In an example embodiment, the snap-fit fastening components 177 are disposed around a peripheral portion of at least the second cover portion 171. More specifically, the first snap-fit fastening component 177A, the second snap-fit fastening component 177B, and the third snap-fit fastening component 177C are spaced from each other along the peripheral portion of the second cover portion 171 between the first screw fastening component 175A and the third first screw fastening component 175C. In an example embodiment, the first snap-fit fastening component 177A is disposed on a peripheral portion of the second cover portion 171. The first snap-fit fastening component 177A is adjacent to the drive assembly portion 121 when the gear cover 106 is disposed on the gear housing 105. The first snap-fit fastening component 177A is disposed between the third screw fastening portion 175C and the second snap-fit fastening component 177B. The second snap-fit fastening component 177B is disposed on a peripheral portion of the second cover portion 171 so as to be between the first snap-fit fastening component 177A and the third snap-fit fastening component 177C. The third snap-fit fastening component 177C is disposed on a peripheral portion of the second cover portion 171 so as to be between the second snap-fit fastening component 177B and the first screw fastening component 175A.

As discussed above, the actuator 100 is configured to provide a drive output. More specifically, referring to FIG. 7 as an example, the actuator 100 is configured to provide a drive output, which is concentric based on the gear assembly 103. However, the actuator 100 is not limited to this type of gear assembly 103. Rather, the gear case 104 is advantageous in also being able to accommodate a gear assembly 103' that is similar to the gear assembly 103 but includes an output shaft 116' instead of the output shaft 116. With gear assembly 103', the actuator 100 is configured to provide a drive output, which is eccentric, as described with respect to FIGS. 18-19.

Figure 18:
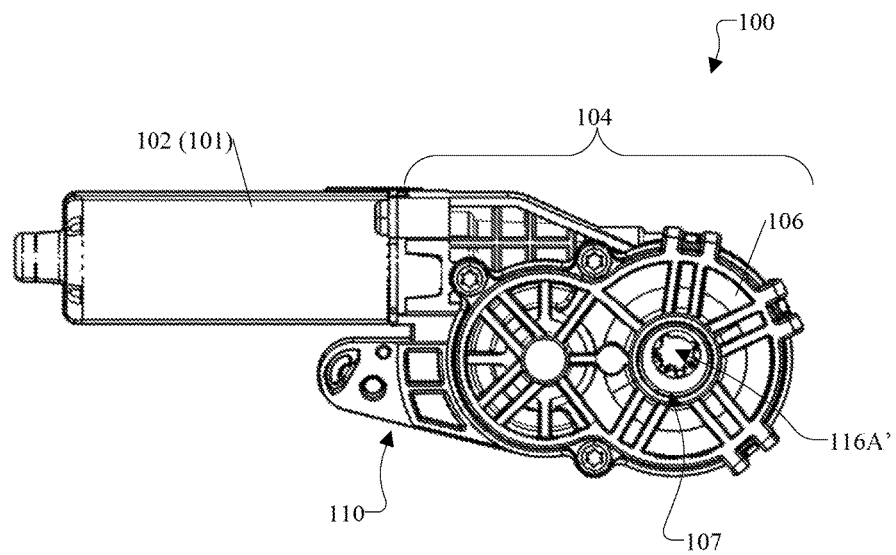
FIG. 18 is a perspective view of an actuator with eccentricity according to another example embodiment of this disclosure.
Figure 19:
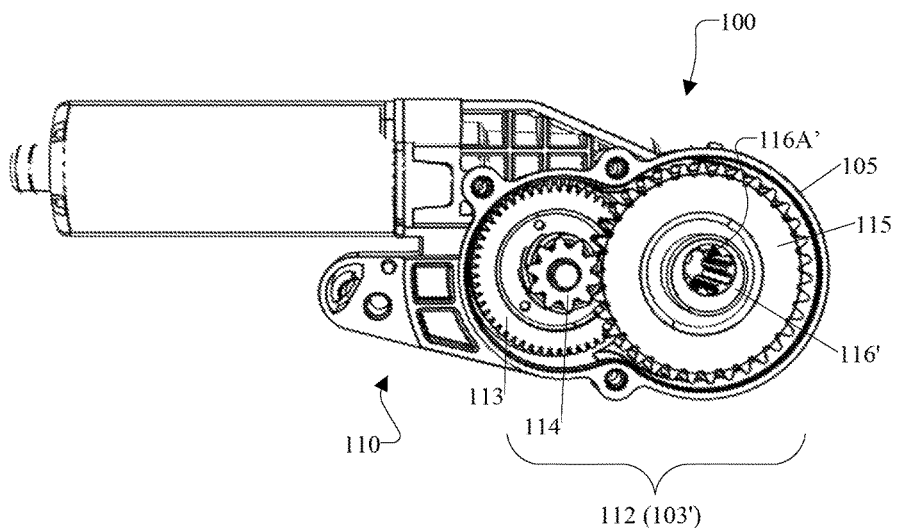
FIG. 19 is a perspective view of the actuator of FIG. 18 in which the gear cover is not secured to the gear housing in this instance according to another example embodiment of this disclosure.

FIGS. 18-19 illustrate the actuator 100, which is configured to provide a drive output that is eccentric according to an example embodiment. More specifically, in FIGS. 18-19, the actuator 100 includes at least the drive assembly 101, the drive housing 102, the gear assembly 103', and the gear case 104. Also, as shown in FIG. 18, the gear case 104 includes the gear cover 106 with the opening 107 to provide access to the slot 116A' in the output shaft 116' of the output gear 115. More specifically, the output gear shaft 116' (FIG. 19) is different from the output gear shaft 116 (FIG. 7) in that a center of the slot 116A' is offset from a center of the output gear 11' whereas a center of the slot 116 is aligned with a center of the output gear 115. This offset position of the slot 116A' is configured to provide the actuator 100 with a drive output that is eccentric. In this regard, the gear case 104 is advantageous in being able to accommodate the gear assembly 103, the gear assembly 103', or any suitable gear assembly while also being mountable to at least one mounting surface 12 via the mounting arm 110 without direct impact from the fastening mechanisms of the gear cover 106 to the gear housing 105 and the various stresses and/or forces associated therewith.

As described above, the gear case 104 provides a number of advantageous features, as well as benefits. For example, the gear case 104 is mountable on a mounting surface 12, whereby the actuator 100 is enabled to function and perform in a normal and effective manner when mounted on the mounting surface 12. Also, the gear case 104 is advantageously structured such that the gear cover 106 is securable to the gear housing 105 via fastening mechanisms that are spaced from the mounting arm 110 so that the fastening mechanisms do not interfere with and/or overlap the mounting arm 110. Moreover, several simulations and analyses of forces have provided positive results that indicate that the fastening mechanisms (e.g., fasteners 173) do not affect the functionality and performance of the drive output of the actuator 100.

In addition, the mounting arm 110 includes a mounting assembly 109, which enables the gear case 104 (and hence the actuator 100) to be aligned and held by at least the pin 156 and the coupling device 157 during a process of securing the mounting arm 110 to the mounting surface 12 with a mechanical fastener 144 via the through-hole 159. Moreover, the through-hole 159 is strategically located on an outer region of the mounting arm 110, thereby being easily accessible for fastening and unfastening the mechanical fastener 144 with respect to the mounting arm 110 and the mounting surface 12. In this regard, the gear case 104 is advantageously configured with the mounting arm 110 such that the process of mounting the actuator 100 to the mounting surface 12 is not cumbersome, thereby being less time consuming to secure the actuator 100 onto at least one mounting surface 12.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A gear housing for at least a gear assembly, the gear housing comprising:
    a first receptacle to house a worm wheel of the gear assembly;
    a second receptacle to house an output gear of the gear assembly;
    an elongated receptacle to house a first portion of a shaft of a drive assembly, the elongated receptacle extending at least partly alongside the first receptacle and the second receptacle;
    a connecting portion that is connectable to another housing that houses a second portion of the shaft of the drive assembly;

a plurality of fastening components including a first fastening component, a second fastening component, and a third fastening component;

a mounting arm mountable to a mounting surface, the mounting arm extending outward from the first receptacle, the mounting arm being disposed between the first fastening component and the second fastening component, the first fastening component and the second fastening component being circumferentially adjacent fastening components along a periphery of the first receptacle, wherein:
the first fastening component is disposed at a juncture between the first receptacle and the second receptacle;
the second fastening component overlaps a part of the elongated receptacles;
the third fastening component is circumferentially adjacent to the second fastening component and disposed at another juncture between the first receptacle and the second receptacle; and
the third fastening component overlaps a part of the elongated receptacle.

2. The gear housing of claim 1, wherein:
the first fastening component includes a first receiving portion that is structured to receive a first fastener that secures a gear cover to the gear housing;
the second fastening component includes a second receiving portion that is structured to receive a second fastener that secures the gear cover to the gear housing; and
the third fastening component includes a third receiving portion that is structured to receive a third fastener that secures the gear cover to the gear housing.

3. The gear housing of claim 1, further comprising:
a coupling device structured to fasten the gear housing onto the mounting surface,
wherein:
the coupling device extends through a slot of the mounting arm, the slot being defined by sidewalls including a sidewall surface portion that is provided at an acute angle with respect to a first axis, the first axis being perpendicular to a longitudinal axis of the gear housing; and
the coupling device extends from the sidewall surface portion at the acute angle.

4. The gear housing of claim 3, wherein the coupling device includes (a) a base portion that extends from the sidewall surface portion, (b) an arm portion that extends from the base portion and through the slot, and (c) a hook portion that extends from the arm portion and protrudes beyond a surface of the mounting arm, the hook portion including a curved hook at an end portion of the arm portion.

5. The gear housing of claim 3, further comprising:
a pin that protrudes outward from a surface of the mounting arm;
wherein:
the mounting arm includes a through-hole that extends from a first side of the mounting arm to a second side of the mounting arm such that a fastener is receivable via the through-hole to secure the gear housing to the mounting surface,
the pin is located closer in distance to the elongated receptacle than the through-hole; and
the pin and the through-hole are disposed between the first receptacle and the coupling device along the longitudinal axis.

6. The gear housing of claim 1, further comprising:
a plurality of snap-fit components along a peripheral portion of the second receptacle,
wherein the plurality of snap-fit components are structured to engage with corresponding snap-fit components of a gear cover for the gear housing.

7. A gear case comprising:
a gear housing including:
a gear assembly portion to house a gear assembly, the gear assembly portion including a first receptacle and a second receptacle;
an elongated receptacle to house a first portion of a shaft of a drive assembly, the elongated receptacle extending at least partly alongside the gear assembly portion;
a plurality of fastening components including a first fastening component, a second fastening component, and a third fastening component; and
a mounting arm mountable on a mounting surface, the mounting arm extending outward from the first receptacle, the mounting arm being disposed between the first fastening component and the second fastening component, the first fastening component and the second fastening component being circumferentially adjacent fastening components along a periphery of the first receptacle; and
a gear cover configured to cover the gear assembly portion, the gear cover being securable to the gear housing via the first fastening component, the second fastening component, and the third fastening component;

wherein:
the first fastening component is disposed at a juncture between the first receptacle and the second receptacle;
the second fastening component overlaps a part of the elongated receptacle;
the third fastening component is circumferentially adjacent to the second fastening component and disposed at another juncture between the first receptacle and the second receptacle; and
the third fastening component overlaps a part of the elongated receptacle.

8. The gear case of claim 7, wherein:
the first receptacle is structured to house a worm wheel of the gear assembly;
the second receptacle is structured to house an output gear of the gear assembly; and
the gear cover includes an opening that provides access to the output gear when the output gear is disposed within the gear housing.

9. The gear case of claim 7, wherein:
the first fastening component includes a first receiving portion that is structured to receive a first fastener that secures the gear cover to the gear housing;
the second fastening component includes a second receiving portion that is structured to receive a second fastener that secures the gear cover to the gear housing; and
the third fastening component includes a third receiving portion that is structured to receive a third fastener that secures the gear cover to the gear housing.

10. The gear case of claim 7, further comprising:
a coupling device structured to fasten the gear housing onto the mounting surface,
wherein:

the coupling device extends through a slot of the mounting arm.

11. The gear case of claim 10, wherein:
the slot is defined by sidewalls including a sidewall surface portion that is provided at an acute angle with respect to a first axis, the first axis being perpendicular to a longitudinal axis of the gear housing; and
the coupling device extends from the sidewall surface portion at the acute angle.

12. The gear case of claim 10, further comprising:
a pin that protrudes outward from a surface of the mounting arm,
wherein:
the mounting arm includes a through-hole that extends from a first side of the mounting arm to a second side of the mounting arm such that a fastener is receivable via the through-hole to secure the gear housing to the mounting surface,
the pin is located closer in distance to the elongated receptacle than the through-hole; and
the pin and the through-hole are disposed between the first receptacle and the coupling device along a longitudinal axis of the gear housing.

13. The gear case of claim 7, further comprising:
a connecting portion that is connectable to another housing that houses a second portion of the shaft of the drive assembly,
wherein:
the mounting arm includes a first section and a second section;
the first section extends from the first receptacle and the second section is disposed at an end of the first section such that the first section is between the first receptacle and the second section;
the first section and the connecting portion are supported by bracing members that extend between a sidewall portion of the mounting arm and a sidewall portion of the connecting portion; and
the second section extends beyond the connecting portion and the bracing members along a longitudinal axis of the gear housing, the second section including a surface that includes (a) a through-hole and (b) a coupling device with a hook portion that protrudes outward from the surface.

14. A gear case comprising:
a gear housing to house a gear assembly, the gear housing including:
a first receptacle to house a worm wheel of the gear assembly;
a second receptacle to house an output gear of the gear assembly;
an elongated receptacle to house a first portion of a shaft of a drive assembly, the elongated receptacle extending at least partly alongside the first receptacle and the second receptacle;
a connecting portion that is connectable to another housing that houses a second portion of the shaft of the drive assembly; and
a mounting arm that includes a first section and a second section, the first section extends from the first receptacle and the second section is disposed at an end of the first section such that the first section is between the first receptacle and the second section,
wherein:
the first section and the connecting portion are supported by bracing members that extend between a sidewall of the mounting arm and a sidewall of the connecting portion; and
the second section extends beyond the connecting portion and the bracing members along a longitudinal axis of the gear housing, the second section including a surface that includes (a) a through-hole and (b) a coupling device with a hook portion that protrudes outward from the surface.

15. The gear case of claim 14, further comprising:
a gear cover configured to cover the first receptacle and second receptacle, the gear cover being securable to the gear housing and including an opening that provides access to an output gear when the output gear is disposed within the second receptacle of the gear housing.

16. The gear case of claim 14, further comprising:
a pin that protrudes from the surface of the mounting arm,
wherein:
the through-hole extends from a first side of the mounting arm to a second side of the mounting arm such that a fastener is receivable via the through-hole to secure the gear housing to a mounting surface,
the pin is located closer in distance to the elongated receptacle than the through-hole; and
the pin and the through-hole are disposed between the first receptacle and the coupling device.

17. The gear case of claim 14, wherein:
the coupling device is structured to fasten the gear housing onto the mounting surface;
the coupling device extends through a slot of the mounting arm, the slot being defined by sidewalls including a sidewall surface portion that is provided at an acute angle with respect to a first axis, the first axis being perpendicular to the longitudinal axis; and
the coupling device extends from the sidewall surface portion at the acute angle.

18. The gear case of claim 14, wherein:
the mounting arm is disposed between circumferentially adjacent fastening components along a periphery of the first receptacle;
the adjacent fastening components include a first fastening component and a second fastening component;
the first fastening component is disposed at a juncture between the first receptacle and the second receptacle; and
the second fastening component overlaps a part of the elongated receptacle.

19. The gear case of claim 18, wherein:
the first fastening component includes a first receiving portion that is structured to receive a first fastener that secures the gear cover to the gear housing; and
the second fastening component includes a second receiving portion that is structured to receive a second fastener that secures the gear cover to the gear housing.

20. The gear case of claim 18, further comprising:
a third fastening component disposed at another juncture between the first receptacle and the second receptacle;
wherein:
the third fastening component is circumferentially adjacent to the second fastening component; and
the third fastening component overlaps a part of the elongated receptacle.

* * * * *

UNITED STATES PATENT AND TRADEMARK OFFICE
CERTIFICATE OF CORRECTION

| | | |
|---|---|---|
| PATENT NO. | : 10,400,881 B1 | Page 1 of 1 |
| APPLICATION NO. | : 16/108491 | |
| DATED | : September 3, 2019 | |
| INVENTOR(S) | : Luis Angel Ramirez Ortiz et al. | |

It is certified that error appears in the above-identified patent and that said Letters Patent is hereby corrected as shown below:

On the Title Page

Item (72), second inventor's name should read:
Andrea Elena Tejeda Guerrero

In the Claims

In Column 15, Lines 16 and 17, Claim 1 should read:
the second fastening component overlaps a part of the elongated receptacle;

Signed and Sealed this
Twelfth Day of November, 2019

Andrei Iancu
*Director of the United States Patent and Trademark Office*